Jan. 13, 1931.  C. H. APPS  1,789,092
JOURNAL BOX FOR RAILROAD VEHICLES
Filed June 6, 1928
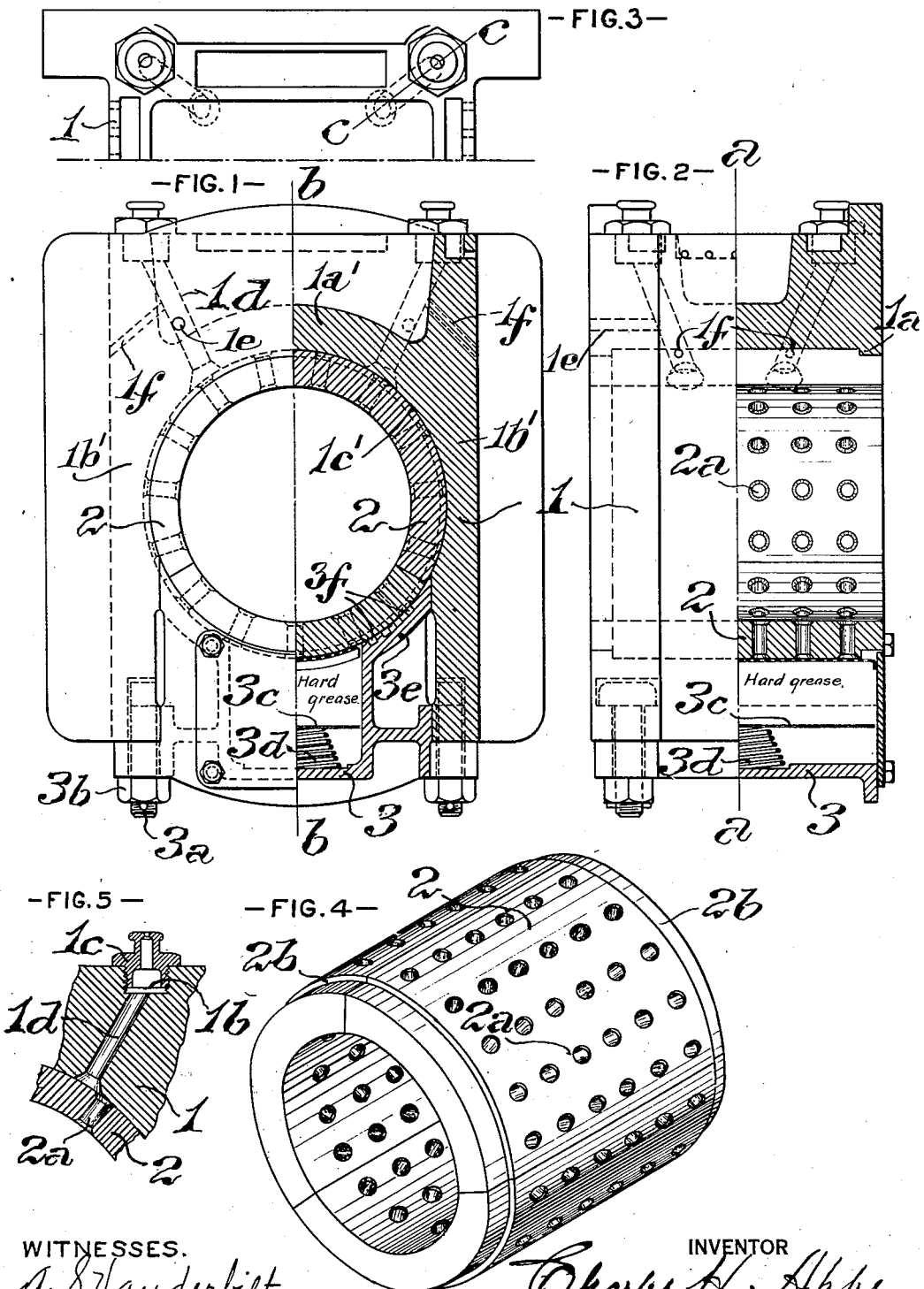

Patented Jan. 13, 1931

1,789,092

UNITED STATES PATENT OFFICE

CHARLES H. APPS, OF SOUTH ORANGE, NEW JERSEY

JOURNAL BOX FOR RAILROAD VEHICLES

Application filed June 6, 1928. Serial No. 283,234.

This invention relates generally to boxes in which the axle journals of railroad vehicles are mounted, and particularly to the bearings thereof. The object of the invention is to provide, in a journal box of conventional form and dimensions, a simple and efficient bearing member, which will attain the advantages of presenting the maximum attainable area of bearing surface; will be of ready application and removal, as desired; will not be binding on the axle journal or in the box; will eliminate necessity for an outer stationary bushing; will present wide cylindrical surfaces on the sides of the lubricant cellar; and which will enable the bushing to be removed vertically without the necessity of lifting the body of the vehicle from the wheels or dropping the wheels into a pit.

The improvement claimed is hereinafter fully set forth.

In the accompanying drawing: Figure 1 is a view, half in front elevation, and half in vertical transverse section, on the line $a\ a$ of Fig. 2, of a journal box illustrating an embodiment of the invention; Fig. 2, a view, half in side elevation, and half in vertical section, on the line $b\ b$ of Fig. 1, of the same; Fig. 3, a half plan or top view; Fig. 4, an isometrical view of the journal bearing, detached; and, Fig. 5, a partial vertical section, on the line $c\ c$ of Fig. 3.

In the practice of the invention, referring descriptively to the specific embodiment thereof which is herein exemplified, the journal box frame, 1, is of conventional form, and has, fitted within it, a journal bearing, 2, hereinafter described, and a lubricant cellar, 3, which is connected, detachably, to the journal box by bolts, $3a$, and nuts, $3b$, and is, similarly to the axle box, of conventional form.

The journal box frame 1, is made in one piece and comprises a top cross portion $1a'$, two spaced legs $1b'$, and a cylindrical bore $1c'$, disposed partially in the cross portion $1a'$, and partially in the legs $1b'$. The bore $1c'$, has a gap at its bottom to permit vertical removal of the sections of the bushing 2, and is made greater than 180° in cross section so that the box frame will present a solid structure at the area above and below the horizontal diameter of the axle. This solid form of construction enables the box frame to efficiently withstand the severe stresses resulting from piston thrusts, which stresses are at their maximum on a line coincident with the horizontal diameter of the axle. In certain constructions heretofore known, the box frame has been divided into two parts at the horizontal diameter of the axle, thus presenting a two piece bearing face which is required to withstand the heavy stresses encountered in service, and which produces relatively rapid wearing of the bushing.

The journal bearings, 2, is in the form of a cylinder, which completely surrounds the axle journal, and, to admit of insertion in, and removal from the journal box, vertically, is split, radially, into three sections. A plurality of apertures, $2a$, for the passage of lubricant to the journal, is formed in each of the sections. The journal bearing is fitted freely in the journal box and on the journal, so as to have the capacity of floating therein and thereon, that is to say, of movement relative thereto about its axial line. Movement, in axial direction, of the bearing, is prevented by shoulders, $2b$, formed on the sections, by slightly reducing their radial dimensions, adjacent to their ends, said shoulders fitting against corresponding shoulders, $1a$, on the axle box.

The journal bearing and journal may be lubricated either from the subjacent lubricant cellar, 3, or from the top of the journal box. The width of the lubricant cellar is less than the diameter of the bearing, and lateral wings, $3e$, curved to the radius of the bearing fitting against it, and extending to the side walls of the journal box, project from the top of the cellar. The lubricant cellar serves in the usual manner, as a receptacle for a cake of hard grease, which is supported upon a plate, $3c$, and pressed against the journal by a spring, $3d$. Suitable longitudinal grooves $3f$ are provided in the wings $3e$ to provide for thorough distribution of lubricant to the bushing.

The described construction is particularly advantageous for use with crank axles of three cylinder locomotives and with locomotives employing Stevenson valve gear, as it enables the floating bushing to be removed in sections vertically between the legs of the box without the necessity of dropping the wheels or lifting the boxes clear of the axles.

Lubricant may be supplied to the journal bearing from oil pockets, 1b, in the top of the journal box, said oil pockets being closed by removable caps, 1c, and communicating with the journal bearing through passages, 1d, leading to its periphery. Passages 1e, leading from the passages 1d, provide for lubricating the hub bearing face of the box, and passages 1f, leading from the passages 1d, provide for lubricating the pedestal faces of the box. This construction enables the floating bushing, and the hub face and a pedestal face of the box, all to receive lubrication from each of the oil pockets 1b. The caps 1c, may be of the well-known alemite type enabling grease under pressure to be forced in the pockets 1b.

The invention claimed as new and desired to be secured by Letters Patent is:

1. In a journal box device, the combination of an integral box frame of substantially inverted U-shape form having a top cross portion, a pair of spaced legs depending from the top portion, and a cylindrical bearing bore disposed partially in the top portion and partially in each leg and terminating at the inner side of the legs to provide a gap for the removal of bushing sections downwardly between the legs, the said bore being greater than 180° in transverse section; a floating cylindrical bushing fitted in the bore and bridging the gap and divided longitudinally into at least three sections each of a width less than the width of the gap; and detachable means disposed between the legs of the box and affording support to the portion of the bushing bridging the gap.

2. In a journal box device, the combination of an integral box frame of substantially inverted U-shape form having a top cross portion, a pair of spaced legs depending from the top portion, and a cylindrical bearing bore disposed partially in the top portion and partially in each leg and terminating at the inner side of the legs to provide a gap for the removal of bushing sections, the said bore being greater than 180° in transverse section; a floating cylindrical bushing fitted in the bore and bridging the gap and divided longitudinally into at least three sections each of a width less than the width of the gap; and detachable means disposed between the legs of the box and directly affording support to the portion of the bushing bridging the gap.

3. In a journal box device, the combination of an integral box frame of substantially inverted U-shape form having a top cross portion, a pair of spaced legs depending from the top portion, and a cylindrical bearing bore disposed partially in the top portion and partially in each leg and terminating at the inner side of the legs to provide a gap for the removal of bushing sections, the said bore being greater than 180° in transverse section; a floating cylindrical bushing fitted in the bore and bridging the gap and divided longitudinally into at least three sections each of a width less than the width of the gap; and a lubricant cellar disposed between the legs of the box and affording support to the portion of the bushing bridging the gap.

4. In a journal box device, the combination of an integral box frame of substantially inverted U-shape form having a top cross portion, a pair of spaced legs depending from the top portion, and a cylindrical bearing bore disposed partially in the top portion and partially in each leg and terminating at the inner side of the legs to provide a gap for the removal of bushing sections, the said bore being greater than 180° in cross section; a floating cylindrical bushing fitted in the bore and bridging the gap and divided longitudinally into at least three sections each of a width less than the width of the gap; and a lubricant cellar disposed between the legs of the box and directly affording support to the portion of the bushing bridging the gap.

5. In a journal box device, the combination of an integral box frame of substantially inverted U-shape form having a top cross portion, a pair of spaced legs depending from the top portion, and a cylindrical bearing bore disposed partially in the top portion and partially in each leg and terminating at the inner side of the legs, to provide a gap for the removal of bushing sections, the said bore being greater than 180° in transverse section; a floating cylindrical bushing fitted in the bore and bridging the gap and divided longitudinally into at least three sections each of a width less than the width of the gap; a lubricant cellar disposed between the legs of the box and affording support to the portion of the bushing bridging the gap and insertable and removable vertically of the box; and means for fastening the cellar to the box and removable vertically of the box to release the cellar.

6. In a journal box device, the combination of an integral axle box of substantially inverted U-shape form having a top cross portion, a pair of spaced legs depending from the top portion and a cylindrical bearing bore disposed partially in the top portion and partially in each leg and terminating at the inner sides of the legs, to provide a gap for the removal of bushing sections, the said bore being greater than 180° in transverse section; a floating cylindrical bushing fitted in the bore and bridging the gap, and divided longitudinally into at least three sections each of a width less than the width of the gap; and a lubricant cellar disposed between the legs of the box and having lateral wings supporting the bushing said wings having longitudinal grooves adapted to distribute lubricant over the bushing.

7. In a journal box device, the combination of an integral box frame of substantially inverted U-shape form having a top cross portion, a pair of spaced legs depending from the top portion, a cylindrical bearing bore disposed partially in the top portion and partially in each leg and terminating at the inner side of the legs to provide a gap for the removal of bushing sections downwardly between the legs, the said bore being greater than 180° in transverse section, and an arcuate flange at each end of the bore projecting inwardly thereof and adapted to restrain longitudinal movement of a cylindrical bushing; a floating cylindrical bushing fitted in the bore and bridging the gap and divided longitudinally into at least three sections each having a width less than the width of the gap said bushing having a circular peripheral recess at each end adapted to receive one of the arcuate flanges of the box frame; and a lubricant cellar detachably fitted between the legs of the box and having lateral arcuate wings for supporting the floating bushing and arcuate flanges at each end mating with the arcuate flanges of the box frame and adapted to fit within the peripheral recesses of the bushing.

CHAS. H. APPS.